C. J. McCARTHY.
STRAINER.
APPLICATION FILED AUG. 26, 1914.
1,153,090.
Patented Sept. 7, 1915.
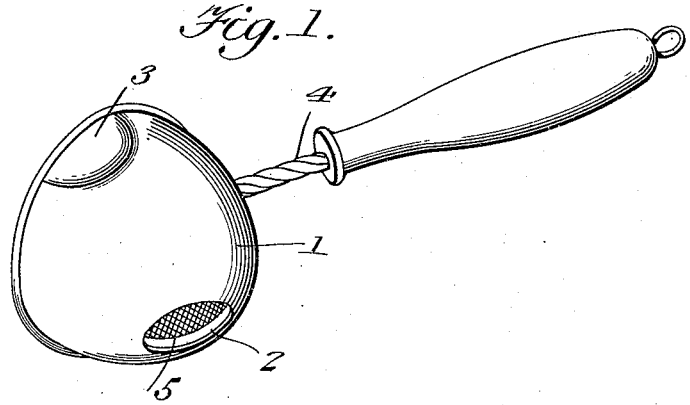
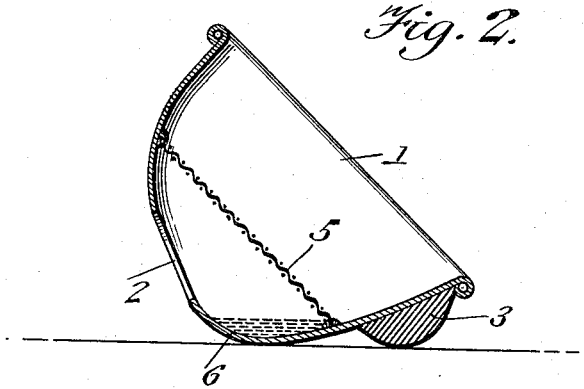
Witnesses
George Ackman Jr.
M. E. Laughlin
Inventor
C. J. McCarthy
By Victor J. Evans
Attorney

UNITED STATES PATENT OFFICE.

CHARLES J. McCARTHY, OF WATERBURY, CONNECTICUT.

STRAINER.

1,153,090.  Specification of Letters Patent.  Patented Sept. 7, 1915.

Application filed August 26, 1914. Serial No. 858,672.

*To all whom it may concern:*

Be it known that I, CHARLES J. MCCARTHY, a citizen of the United States, residing at Waterbury, in the county of New Haven and State of Connecticut, have invented new and useful Improvements in Strainers, of which the following is a specification.

This invention relates to strainers and it consists in the novel features hereinafter described and claimed.

An object of the invention is to provide a strainer of simple and durable structure adapted to be used in conjunction with a teapot during the act of pouring tea whereby the tea may be directed from the pot into a cup or other receptacle.

With this object in view the strainer comprises a cup shaped body having an opening located at one side of the center of its bottom and a weight located exteriorly of the body at the opposite side of the center. A handle is attached to the said cup shaped body and a screen is located within the body at a point between the weight and the opening.

The parts of the strainer are so arranged that when the strainer is laid down upon the top of a table or other support the said weight will cause the strainer to tilt to one side whereby no drippings can pass from the strainer upon the table top and the drippings from the screen will lodge in the lower portion of the body of the cup.

In the accompanying drawing:—Figure 1 is a perspective view of the strainer. Fig. 2 is a transverse sectional view through the cup thereof.

The strainer includes a cup shaped body 1 provided at its bottom and one side of the center thereof with an opening 2. The said body 1 is provided upon its exterior and in the vicinity of its edge and at a point opposite the center of the said body 1 from the opening 2 with a weight 3 which disposes the center of gravity of the strainer as an entirety to one side of the center of the bottom of the cup shaped body 1. A handle 4 is attached at one end to the body 1 and may be provided with any suitable style of handle grip. A screen 5 is located in the cup shaped body 1 disposed approximately parallel with the upper edge thereof. The said screen 5 is located between the opening 2 and the weight 3. The cup shaped body 1 is made a little deeper at that portion of its bottom which lies directly between the edge of the opening 2 and the weight 3 as best illustrated in Fig. 2 of the drawing. The said deep portion is indicated at 6.

From the above description taken in conjunction with the accompanying drawing it will be observed that when the cup shaped body 1 is placed over a cup or other receptacle and liquid is poured into the body 1 the said liquid is strained through the screen 5 and passes down through the opening 2 into the said cup or receptacle. When it is desired to lay the strainer down upon a table or other support without permitting the contents thereof to drip the cup shaped body 1 is placed upon a surface in the position as indicated in Fig. 2 of the drawing. Thus the weight 3 will cause one edge portion of the body 1 to descend which will bring the portion 6 of the said cup-shaped body directly above the surface or support upon which the strainer rests. Consequently the edges of the opening 2 are elevated and any liquid that may remain in the strainer is caught in the deep portion 6 thereof and any liquid which may run down the screen 5 is also caught in the said deep portion.

Having described the invention what is claimed is:—

A strainer comprising a cup-shaped body provided in its bottom at one side of the center thereof with an opening, a screen located in the body and parallel with the edge thereof and positioned between the edge of the body and the said opening therein, and a weight mounted at the exterior of the body in the vicinity of the edge thereof and positioned at the opposite side of the center of the body from that side at which the said opening is located.

In testimony whereof I, affix my signature in presence of two witnesses.

CHARLES J. McCARTHY.

Witnesses:
EDWARD B. REILEY,
THOMAS F. MCGRATH.

Copies of this patent may be obtained for five cents each, by addressing the "Commissioner of Patents, Washington, D. C."